Oct. 1, 1968 R. J. SABATELLA 3,404,317
CIRCUIT BREAKER PANEL ASSEMBLY
Filed June 23, 1967

INVENTOR.
ROBERT J. SABATELLA
BY *Robert F. Casey*
ATTORNEY

United States Patent Office 3,404,317
Patented Oct. 1, 1968

3,404,317
CIRCUIT BREAKER PANEL ASSEMBLY
Robert J. Sabatella, Southington, Conn., assignor to General Electric Company, a corporation of New York
Filed June 23, 1967, Ser. No. 648,503
3 Claims. (Cl. 317—119)

ABSTRACT OF THE DISCLOSURE

A circuit breaker panel assembly having contact members which accept certain types of circuit breakers and reject other closely similar types. Stationary panel contact blades are notched at their outer ends so that circuit breakers having a given configuration of notched resilient contact engaging clips will be rejected thereon, but circuit breakers having an unnotched resilient clip can be readily engaged.

Background of the invention

Circuit breaker panel assemblies, of the type referred to, receive circuit breakers by "plug-in" type mounting, by which electrical connection is made to a stationary contact carried by the panel (see for example Patent No. 2,738,446, W. J. Fleming). Originally, the circuit breakers used in the panels were such that one single-pole breaker was connected to each such stationary contact (although two such contacts might be in close side-by-side arrangement or even form part of a single member).

Later special "double" or "duplex" circuit breakers were developed with two separate circuit breakers in a single casing having the same kind of plug-in contact as previous single unit breakers. Thus the number of circuit breakers which could be installed in a given panel was thereby doubled.

The possibility of connecting a larger number of circuit breakers in a given panel assembly creates the danger that more breakers can be installed in the panel than the bus bars of the panel can safely supply. For this reason it is desirable to provide a means for controlling the usage of such "double" circuit breakers so that such inadvertent "overloading" of the panel will not occur because of improper use of such "double" circuit breakers. This general objective may be described as providing a means of "circuit limitation," i.e., limiting the number of circuits which can be supplied from a given panel assembly. Thus the current National Electrical Code requires that such circuit limitation means be provided (see Art. 384 Par. 15, N.E.C.).

In addition, circuit breaker panel boards are generally able to receive circuit breakers of a variety of amperage ratings, the desirability of the use of any circuit breaker of a given rating being dictated by the requirements of the device to be protected. Generally it is desirable when using circuit breakers of the plug-in type to restrict the use of circuit breakers of certain ratings in a panel board. For example, a circuit breaker of a given rating may be initially used in connection with a certain device to provide adequate protection therefor. However, if the circuit breaker is frequently tripping due to a current of the load it may be attempted to replace the circuit breaker with one of a higher rating. Such a replacement may be dangerous, in that it defeats the protective purpose of the circuit breaker and a fire or destruction of the device might result. Therefore, it is desirable to provide means for controlling the use of circuit breakers according to their ampere rating. The present invention may be used for either of the above described purposes, that is, for providing "circuit limitation" or for providing for "non-interchangeability" of circuit breakers of different ratings.

Summary of the invention

It is an object of the present invention to provide a circuit breaker panel board having contact members which prohibit engagement therewith by certain types of circuit breakers while allowing engagement by certain other types of closely similar circuit breakers.

In accordance with the invention, blade-like contact members are provided, having their outer corners notched so that the outer edge of each of the contacts is of a shorter length than the length of the central body of the contact. Circuit breakers having one type of contact engaging clip which includes two, resiliently cooperating substantially C-shaped legs are able to easily engage the contact member since the legs terminate in outwardly-diverging portions which are cammed apart upon engagement with the upper edge of the contact member. However, circuit breakers having contact engaging clips of the same general type as the first type of clips but which have the outwardly-diverging portion of one of the clips cut away, cannot be plugged onto the contact. Thus the cut-away portion of the clip leaves a horizontal edge which abuts the uppermost outer edge of the contact when attempting to plug the clip onto the contact and does not afford any camming action to spread the clip apart. Circuit breakers having either type of clip can easily engage blade-like contact members which do not have notched portions, however, since the remaining portion of the cut-away clips are able to engage the upper edge of the unmodified stationary contact and to spread the contact jaws before the aforesaid horizontal edge portion engages the upper edge.

The specification concludes with claims particularly pointing out and distinctly claiming the subject matter which I regard as my invention.

Brief description of the drawings

The embodiment of my invention is described in detail in the following description taken in connection with the accompanying drawings in which.

Description of the preferred embodiment

Figure 1A:
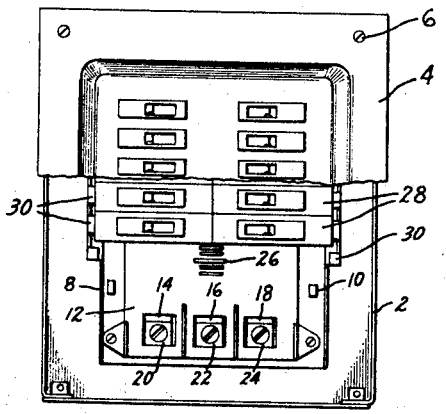
FIGURE 1A is a front elevation view of a circuit breaker panel board incoporating my invention, the front cover thereof being partially broken away.

FIGURE 1A shows my invention as incorporated in a circuit breaker panel board including an outer enclosure 2 having a front cover plate 4 retained thereon by suitable means such as screws 6. Also included is a supporting pan 8 resiliently supported by arcuate strip springs 10. The pan 8 serves to support a suitable bus bar assembly. The bus bar assembly includes a body of insulating material 12 having embedded therein three elongated and generally parallel bus bars 14, 16, 18. The bus bars have portions thereof projecting from the insulating body at one end and carrying line connecting terminals 20, 22, 24, respectively. Each of the bus bars 14, 16, 18 has attached thereto along its length one or more blade-type contacts 26, which may include both segregating type contacts 26a and universal type contacts 26b. All of the blade-type contacts 26 are arranged in substantial alignment generally centrally of the insulating body 12 about the central bus bar 16. A panel assembly of the type referred to is shown and described in Patent No. 2,738,446 W. J. Fleming, assigned to the same assignee as the present invention. While this type of insulation has been shown as a matter of convenience, it will be readily appreciated that the specific insulation means may take various forms.

Figure 1B:
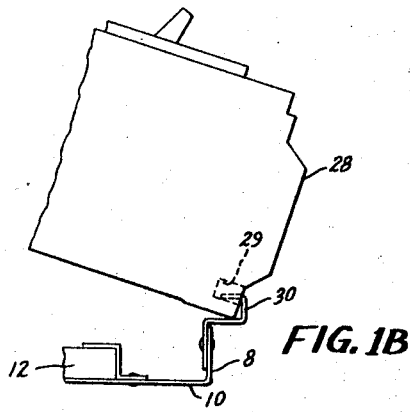
FIGURE 1B is a fragmentary side view of the hook-on engagement of a circuit breaker onto the panel board.

As shown in FIGURE 1B, the panel board further includes a number of electric circuit breakers 28, the casing of each of which has a recess 29 at one end adapted to hook-on to the supporting pan 8, by engagement with retaining hooks 30. As shown in FIGS. 3–7, a corner of each of the circuit breakers 28, opposite from the corner engaged under the hooks 30, is provided with a blade receiving socket clip 32 as in FIG. 4 or 46 as in FIG. 7, in a suitable conforming recess within the insulating casing of the circuit breaker 28.

Figure 2:
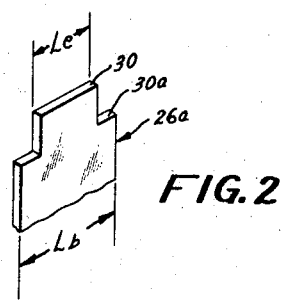
FIGURE 2 is a fragmentary perspective view showing a segregating contact.

FIGURE 2 shows a close up view of a segregating, blade-like contact 26a, as generally shown in FIGURE 1 which allows only certain circuit breakers to be engaged thereon. The contact 26a is of substantially rectangular shape, having the outward corners notched, so that the length $L_e$ of the outer edge 30 of the contact 26a is smaller than the length $L_b$ of the body of the contact 26a.

Figure 3:
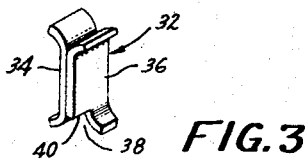
FIGURE 3 is a perspective view of a first type of a circuit breaker socket clip.

FIGURE 3 shows a first type of contact engaging, circuit breaker socket clip 32 which cannot engage the segregating contact 26a. The clip 32 includes two opposed substantially C-shaped legs 34, 36 which are resiliently held together. A small portion of one of the legs 36 is cut away at the lower end of the leg 36 so as to form a substantially horizontal edge 40. The cut away portion 38 is dimensioned so that length of the remaining portion of the lower end of the leg 36 does not engage the outer edge 30 nor the edge 30a of the segregating contact 26a when the circuit breaker is pivoted about the hooked-on (as described below) end 29 so as to become connected to the panel board.

Figure 4:
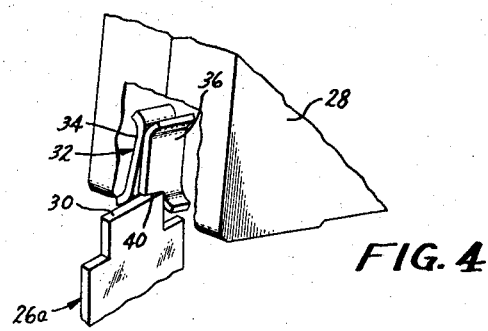
FIGURE 4 is a fragmentary perspective view of a circuit breaker having the first type of clip being rejected by the segregating contact shown in FIGURE 2.

In FIGURE 4, details of an attempted engagement and ultimate rejection of a circuit breaker 38 having the first type of clip 32 with the segregating contact 26a is shown. As shown in FIGURE 1B when the circuit breaker 28 is attempted to be inserted upon the contact 26a, the recess 29 is slid into engagement with the hook 30 and the breaker is pivoted until the horizontal edge 40 of the clip 32 abuts the outer edge 30 of the contact 26a. This abutment prevents the spreading of the contact legs 34, 36 so that the clip 32 cannot substantially engage the contact 26a.

Figure 5:
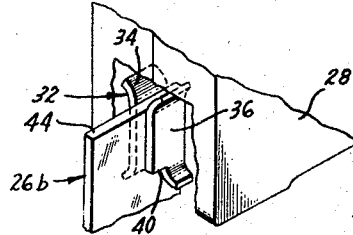
FIGURE 5 is a fragmentary perspective view of a circuit breaker having a first type of clip engaging a universal contact.

FIGURE 5 shows the engagement of a circuit breaker 28 with the first type of clip 32 onto a universal contact 26b. The universal contact 26b is a rectangular blade-like member, similar to the contact 26a shown in FIGURE 2, but without the notched portion, i.e. it is planar. When the clip 32 is inserted upon the contact 26b the lower curved, unnotched portions of the legs touch the upper edge 44 of the contact 26b so that the legs 34, 36 are spread apart before the horizontal surface 40 of the notch of the clip has a chance to contact the upper edge 44. The clip 32 can then be inserted the remainder of the distance easily with no impediment.

Figure 6:
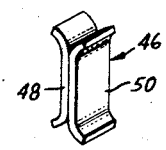
FIGURE 6 is a perspective view of a second type of circuit breaker socket clip.

FIGURE 6 shows a second type of contact engaging, circuit breaker socket clip 46 which can engage either type of contact 26a, 26b. The clip 46 includes two, opposed C-shaped legs 48, 50 which are resiliently held together.

Figure 7:
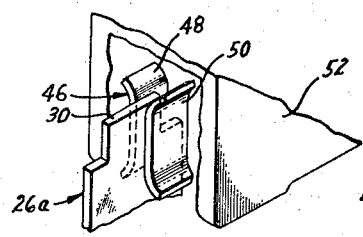
FIGURE 7 is a fragmentary perspective view of circuit breakers having a second type of clip engaging the segregating contact shown in FIGURE 2.

A circuit breaker 52 having the second type of clip 46 can be engaged upon the segregating contact 26a, as shown in FIGURE 7. The lower, rounded portions of the clip legs 48, 50 are spread apart when encountering the upper edge 30 of the contact 26a. The clip 46 can easily be inserted the rest of the way so as to provide substantial engagement with the contacts 26a. It is readily apparent that a circuit breaker having a second type of clip can engage the universal contact 26b in the same manner in which it engages the segregating contact 26a.

When circuit breakers having the first type of clip 32 engage the universal contact 26b or when breakers having the second type of clip 46 engage either the segregating contact 26a or the universal contact 26b, the clips are received on substantially half of the contact so that other circuit breakers in end-abutting relationship therewith can be engaged on the other half of the contact.

Thus, a panel board can be provided with any suitable number of universal or segregating contacts such that circuit breakers having the first type of clip (one with the small notch) can engage only the universal contacts and are prevented from engaging the segregating contacts. Whereas circuit breakers having a second type of clip (one without a notch) can engage either the segregating or universal contacts. Circuit breakers having certain ratings which would be dangerous if used for certain circuits are thereby prevented from being inadvertently or deliberately engaged at given portions on a panel board while other circuit breakers having desirable ratings are permitted to be engaged.

While I have disclosed only one embodiment of my invention, it will be apparent to those skilled in the art that many modifications thereof may be made and I, therefore, intend by the appended claims to cover all such modifications as fall within the true spirit and scope of my invention.

What I claim as new and desire to secure by Letters Patent of the United States is:

1. In a circuit breaker panel board comprising a support means, a plurality of circuit breakers, each of which may be pivotally engaged at one end to a hook portion of said support means, and a plurality of substantially rectangular contacts which are supported at one end by said support means and are each connected to one of a plurality of bus bars coming from an A-C power source, the improvement comprising: at least one of said contacts having a notch at a corner of an unsupported end thereof, at least one of said circuit breakers having a notched clip with a cut-away notch, the notches and the positioning of said one circuit breaker and said one contact being relatively dimensioned so that abutment occurs between the notched clip and said one of said contacts when engagement therebetween is attempted.

2. In a circuit breaker panel board as in claim 1, the improvement further comprising:
    (a) the other of said contacts being unnotched;
    (b) the other of said circuit breakers having unnotched clips, said unnotched clips being able to completely engage any of said contacts; and
    (c) the notch of said clip of said one circuit breaker further being dimensioned so that after said one circuit breaker has been pivotally engaged at one end, the unnotched portion of said notched clip will first engage one of said other contacts thereby allowing said notched clip to be completely engaged thereupon.

3. In a circuit breaker panel board as in claim 2, the improvement further comprising:
   (a) said one contact having each of two corners of the unsupported end thereof notched a given distance so as to form an outer contact edge of substantially shorter length than that of the unnotched portion of said one contact;
   (b) said hook portion of said support means being positioned so that each of said circuit breakers, when pivotally engaged thereupon, extends only to a distance halfway along the length of a corresponding one of said contacts.

References Cited

UNITED STATES PATENTS

| | | | |
|---|---|---|---|
| 2,738,445 | 3/1956 | Hammerly et al. | 317—119 |
| 3,054,025 | 9/1962 | Edmunds | 317—119 |
| 3,095,524 | 6/1963 | Leonard et al. | 317—119 X |

LEWIS H. MYERS, *Primary Examiner.*

J. R. SCOTT, *Assistant Examiner.*